US012026169B2

(12) United States Patent
El Kaed et al.

(10) Patent No.: US 12,026,169 B2
(45) Date of Patent: *Jul. 2, 2024

(54) CONTEXTUAL-CHARACTERISTIC DATA DRIVEN SEQUENTIAL FEDERATED QUERY METHODS FOR DISTRIBUTED SYSTEMS

(71) Applicant: SCHNEIDER ELECTRIC USA, INC., Andover, MA (US)

(72) Inventors: Charbel Joseph El Kaed, New York City, NY (US); Stephen Dillon, Kingston, NH (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,539

(22) Filed: May 19, 2023

(65) Prior Publication Data
US 2023/0306036 A1      Sep. 28, 2023

Related U.S. Application Data

(63) Continuation of application No. 17/647,121, filed on Jan. 5, 2022, now Pat. No. 11,693,865, which is a
(Continued)

(51) Int. Cl.
    *G06F 16/2458*      (2019.01)
    *G06F 16/25*      (2019.01)
    *G06F 16/9038*      (2019.01)

(52) U.S. Cl.
    CPC ...... *G06F 16/2471* (2019.01); *G06F 16/2474* (2019.01); *G06F 16/256* (2019.01); *G06F 16/9038* (2019.01)

(58) Field of Classification Search
    CPC ............. G06F 16/2471; G06F 16/9038; G06F 16/256; G06F 16/2474
(Continued)

(56) References Cited

U.S. PATENT DOCUMENTS

| 2002/0026443 A1 | 2/2002 | Chang et al. |
| 2007/0226186 A1 | 9/2007 | Ewen et al. |

(Continued)

FOREIGN PATENT DOCUMENTS

| CN | 102822819 A | 12/2012 |
| CN | 103562910 A | 2/2014 |

(Continued)

OTHER PUBLICATIONS

Arsian et al. "Real-time environmental monitoring, visualization and notification system for construction H&S management," Journal of Information Technology in Construction, vol. 19, p. 72-91. <http://www.itcon.org/2014/4> (Year: 2014).

(Continued)

*Primary Examiner* — Kimberly L Wilson
(74) *Attorney, Agent, or Firm* — Lando & Anastasi, LLP

(57) ABSTRACT

Methods and systems are disclosed for a sequential federated query for information in a residential, commercial, and/or distributed system. A method of processing a sequential federated query for distributed systems may comprise receiving a sequential federated query; deconstructing the sequential federated query into query elements; identifying a Contextual-Characteristic Data Source (CCDS), a Transactional-Unstructured Data Source (TUDS), and a data organization parameter based on the query elements; generating a CCDS result data set from the CCDS based on the data organization parameter; processing the CCDS result data set to develop a TUDS query based on the data organization parameter; generating a TUDS result data set from the TUDS based on the developed TUDS query and the data organization parameter; generating a final sequential federated query data set based on the TUDS result data set and the data organization parameters; processing a formatted sequential federated query data set based on the processing
(Continued)

of the final sequential federated query data set and the data organization parameter; and providing the formatted sequential federated query data set to a management system for action.

20 Claims, 13 Drawing Sheets

Related U.S. Application Data continuation of application No. 16/309,380, filed as application No. PCT/US2017/039022 on Jun. 23, 2017, now Pat. No. 11,222,032.

(60) Provisional application No. 62/354,007, filed on Jun. 23, 2016.

(58) Field of Classification Search
USPC .......................................................... 707/770
See application file for complete search history.

(56) References Cited

U.S. PATENT DOCUMENTS

| | | |
|---|---|---|
| 2008/0104089 A1 | 5/2008 | Pragada et al. |
| 2009/0234799 A1 | 9/2009 | Betawadkar-Norwood et al. |
| 2016/0063060 A1 | 3/2016 | Nguyen et al. |
| 2016/0147888 A1 | 5/2016 | Nguyen et al. |
| 2017/0031986 A1 | 2/2017 | Li et al. |

FOREIGN PATENT DOCUMENTS

| | | |
|---|---|---|
| CN | 104951464 A | 9/2015 |
| CN | 105210063 A | 12/2015 |
| EP | 2343658 A1 | 7/2011 |

OTHER PUBLICATIONS

Notification of Transmittal of the International Search Report and the Written Opinion of the International Searching Authority from corresponding PCT/US2017/039022 dated Sep. 27, 2017.

Oguz et al. "Federated query processing on linked data: a qualitative survey and open challenges," The Knowledge Enginerring Review, vol. 30:5, pp. 545-563. (Year: 2015).

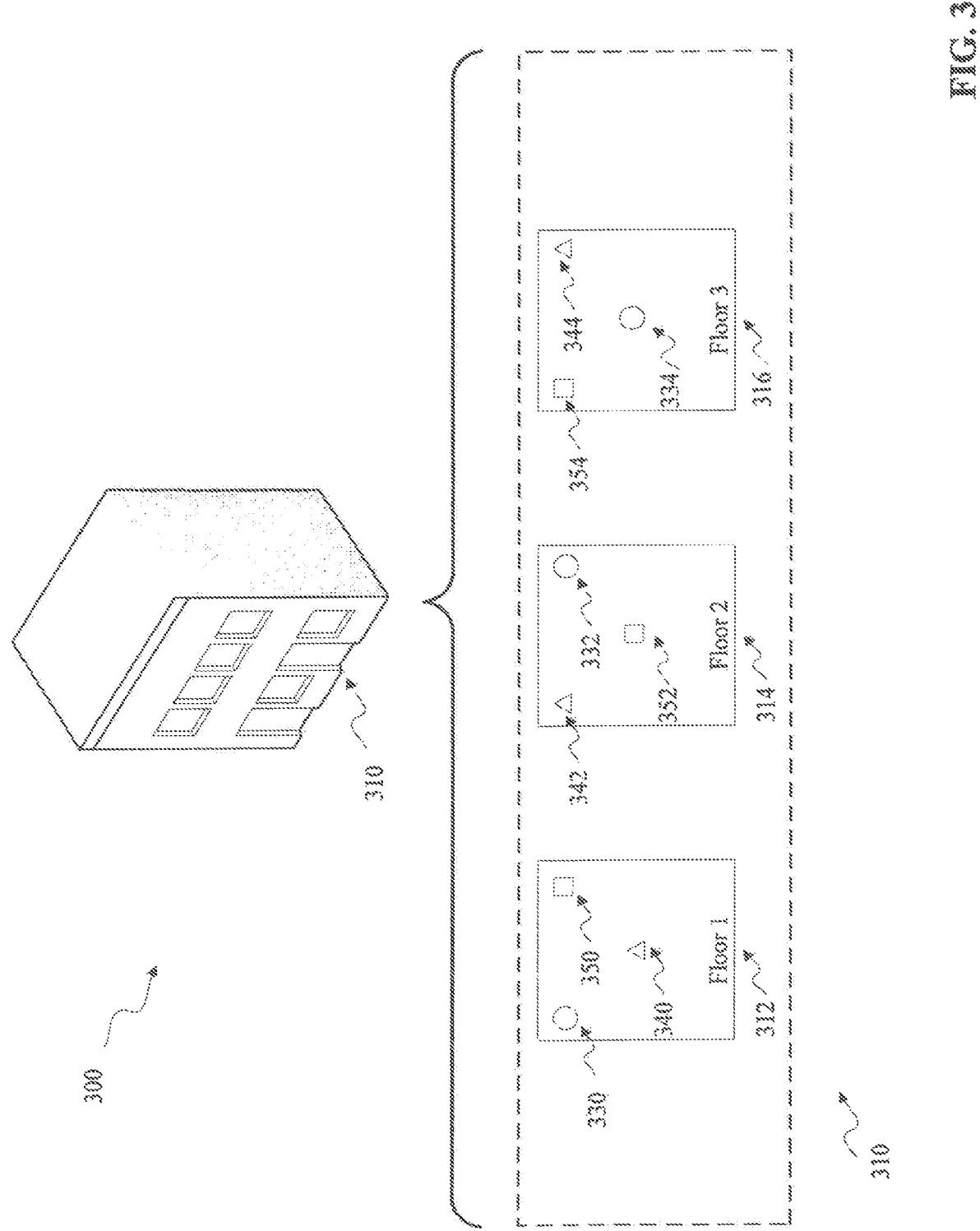

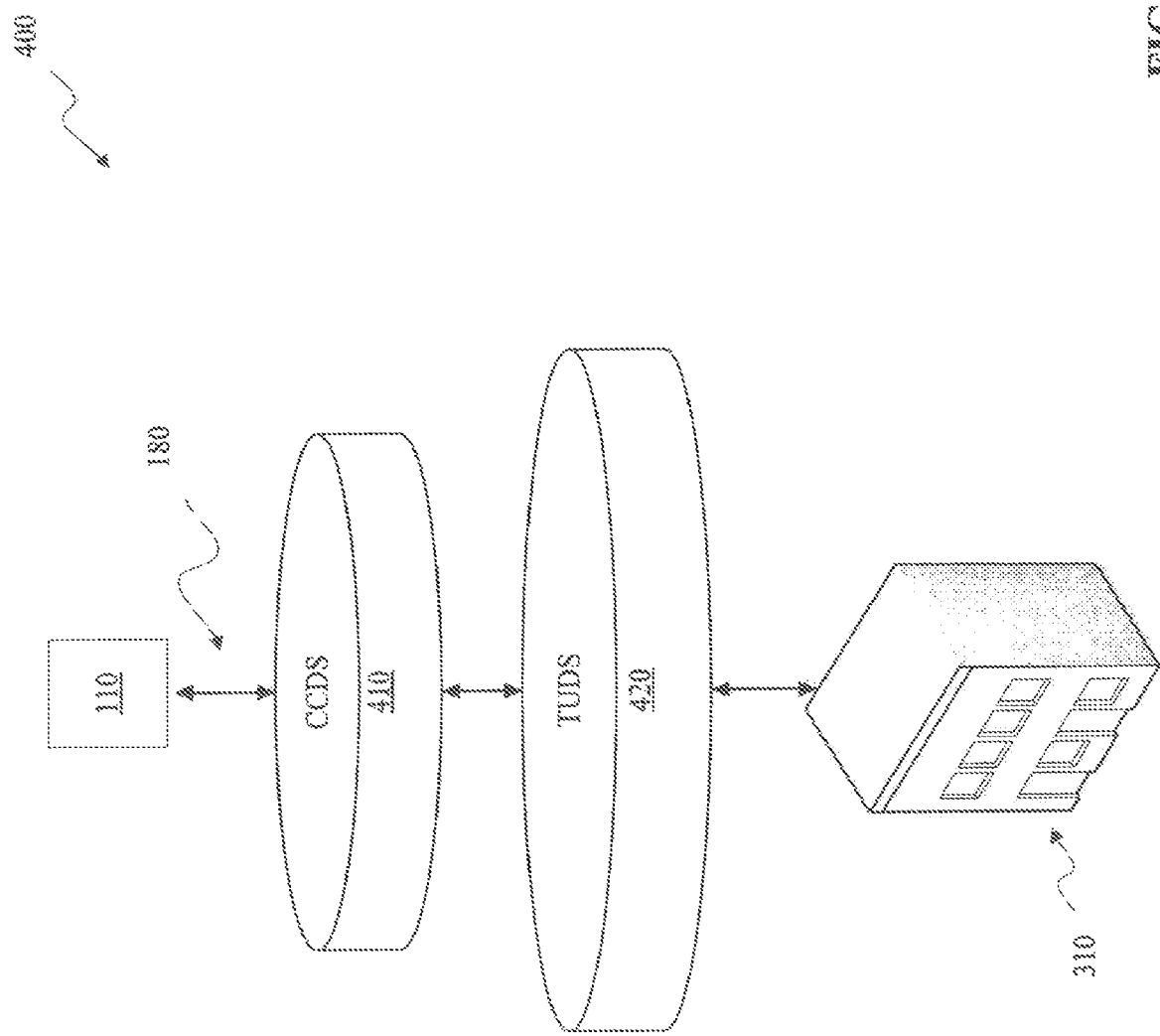

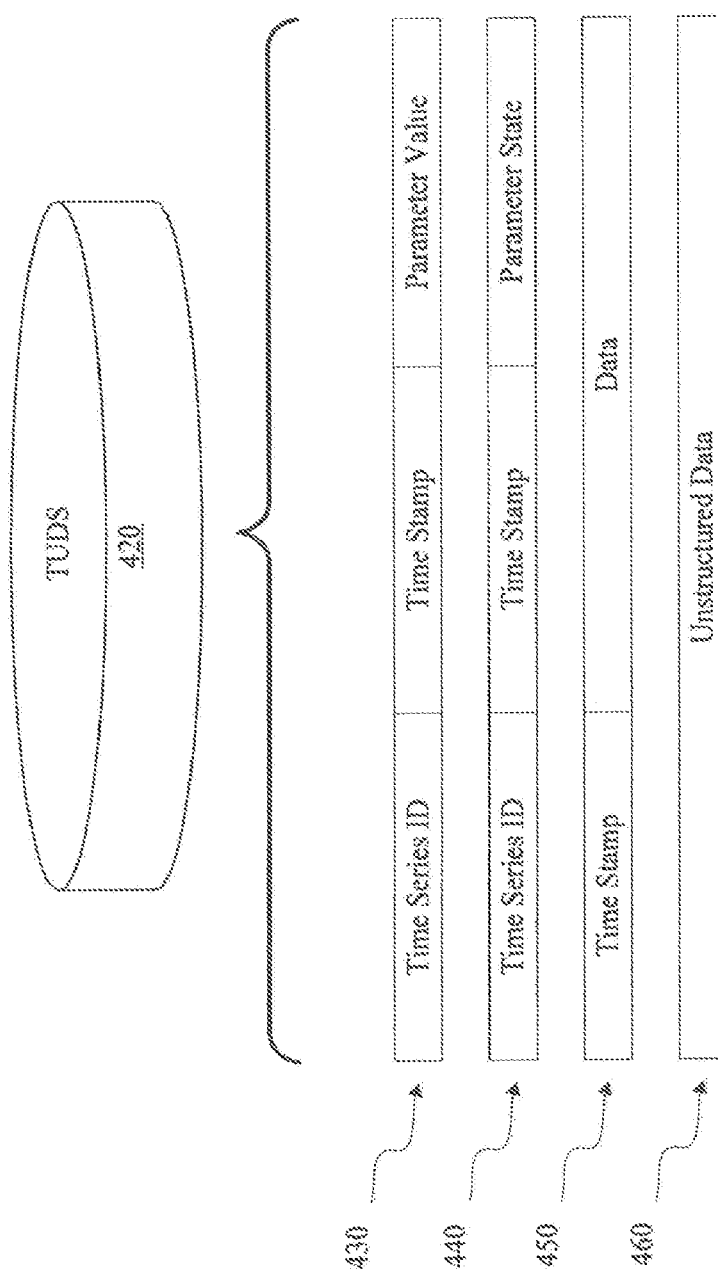

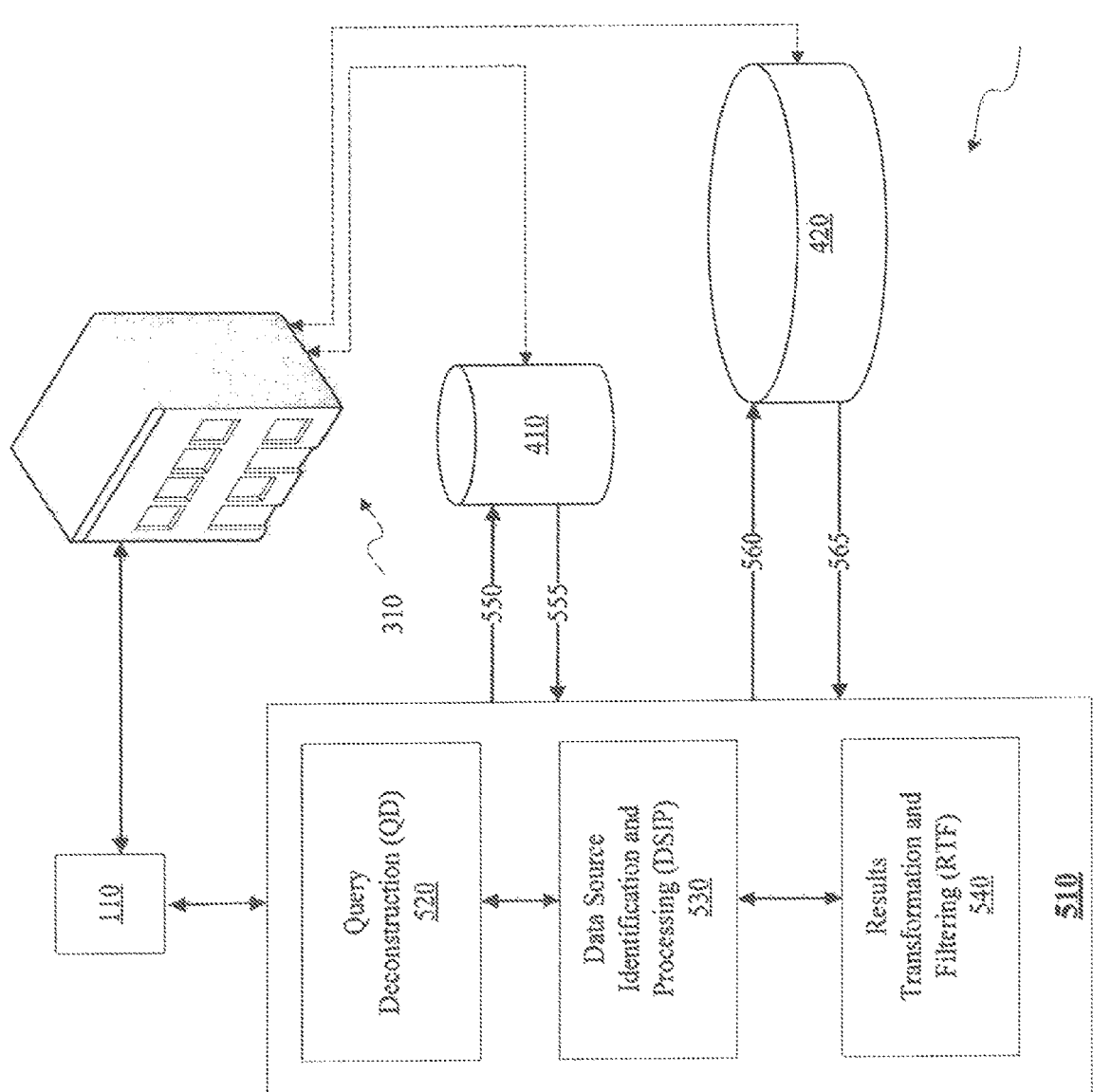

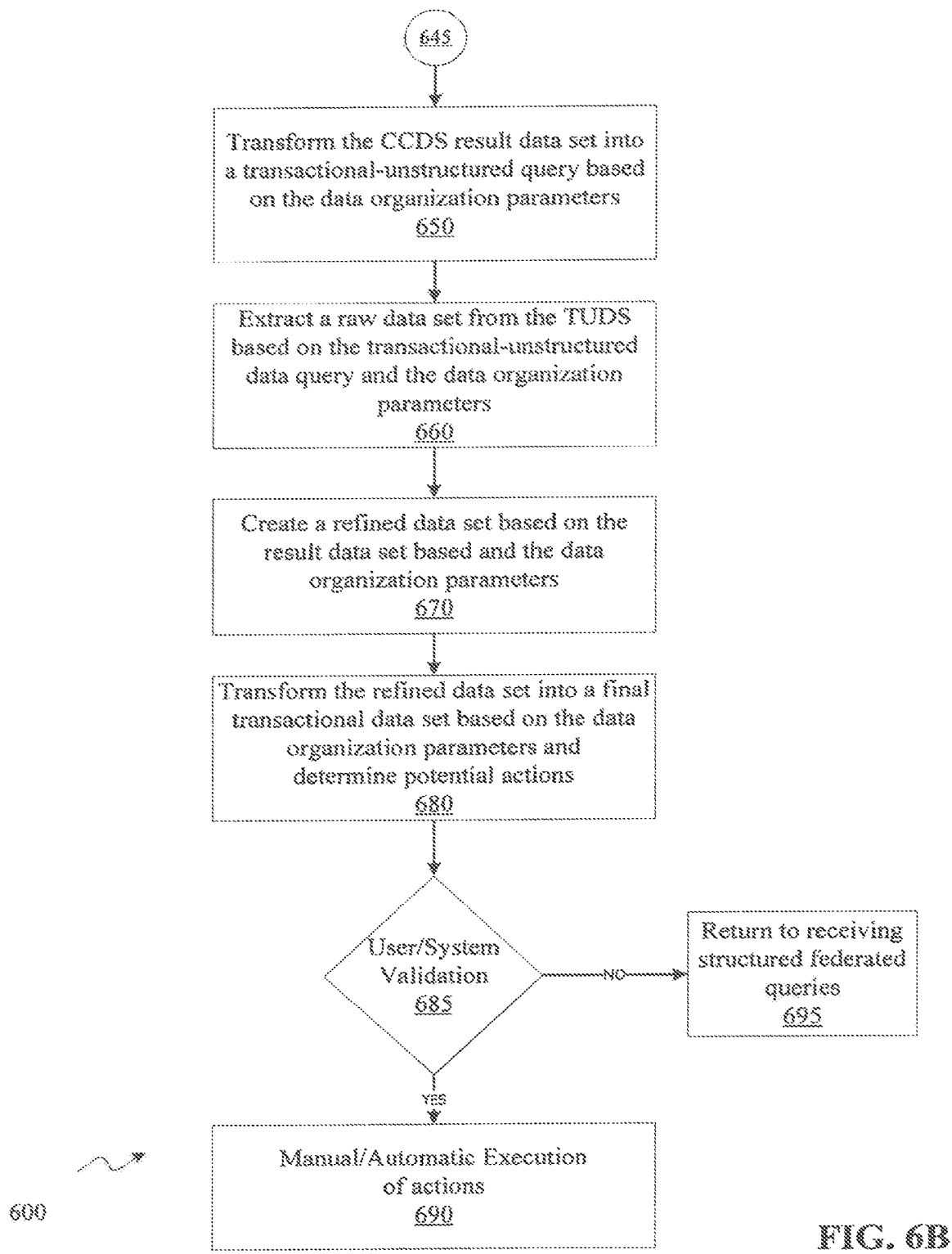

CONTEXTUAL-CHARACTERISTIC DATA DRIVEN SEQUENTIAL FEDERATED QUERY METHODS FOR DISTRIBUTED SYSTEMS

CROSS-REFERENCE TO RELATED APPLICATIONS

This application is a continuation of U.S. patent application Ser. No. 17/647,121 filed Jan. 5, 2022, titled CONTEXTUAL-CHARACTERISTIC DATA DRIVEN SEQUENTIAL FEDERATED QUERY METHODS FOR DISTRIBUTED SYSTEMS, which is a continuation of U.S. patent application Ser. No. 16/309,380 [now U.S. Pat. No. 11,222,032] filed Dec. 12, 2018, titled CONTEXTUAL-CHARACTERISTIC DATA DRIVEN SEQUENTIAL FEDERATED QUERY METHODS FOR DISTRIBUTED SYSTEMS, which is a U.S. National Stage Application under 35 U.S.C. § 371 of International Application No. PCT/US2017/039022 filed Jun. 23, 2017, titled CONTEXTUAL-CHARACTERISTIC DATA DRIVEN SEQUENTIAL FEDERATED QUERY METHODS FOR DISTRIBUTED SYSTEMS, which claims the benefit under 35 U.S.C. § 119(e) of U.S. Provisional Application No. 62/354,007 filed Jun. 23, 2016, titled CONTEXTUAL-CHARACTERISTIC DATA DRIVEN SEQUENTIAL FEDERATED QUERY METHODS FOR DISTRIBUTED SYSTEMS. Each application referenced above is hereby incorporated herein by reference in its entirety for all purposes.

FIELD OF THE INVENTION

Embodiments of the present disclosure relate generally to methods of data organization, and more specifically to systems and methods for querying data associated with distributed residential, commercial, and/or industrial systems.

BACKGROUND

Description of the Related Art

This application claims priority to and benefit from the following provisional patent application: U.S. Provisional Application Ser. No. 62/354,007 titled "Contextual-Characteristic Data Driven Sequential Federated Query Methods for Distributed Systems" filed on Jun. 23, 2016. The entire contents of the aforementioned patent applications are expressly incorporated by reference herein.

The Internet of Things (IoT) promises to interconnect elements together on a massive scale. These connected elements may include devices, vehicles, homes, cities, and any other system or collection of systems that contain the applicable electronic hardware, software, sensors, and connectivity that enables these systems to collect and exchange data. Such amalgamation allows this massive amount of data, when collected on a global scale, transform into actionable information. Interactions and collaborations between systems form in order to fulfill one or more specific tasks. Such tasks differ according to the context and environment of application. For example, tasks may range from sensing and monitoring of an environmental characteristic such as temperature or humidity of a single room to controlling and optimization of an entire building or facility in order to achieve a larger objective such as an energy management strategy.

Depending on the application, connected elements include heterogeneous and/or homogenous hardware that facilitate sensing, operation, actuation, data capture, data storage, data processing and/or data analytics. Each type of element includes a unique data structure that details a digital representation of the capabilities of the hardware itself and/or measured parameters. For example, a temperature sensor may implement different hardware to facilitate temperature measurements. This hardware may also in turn provide different data parameters, values, and/or operational units, such as temperature measurement units, time format, MAC address, IP address, and/or CPU type data.

Data structure unit, value, and parameter complexities are exacerbated by storage and organization distributions that may exist situated across any number of memory storage locations or hybrid data structures within multiple repositories. Further, such data accessibility is complicated by trying to unify accessibility to data sets that span a large and inconsistent temporal period, storing periodic, state based or unstructured data. Accordingly, with truly massive amounts of heterogeneous data available through the wide variety of available connected elements and their respective data structures, efficiently and effectively analyzing this voluminous data presents a serious challenge.

SUMMARY

Methods and systems that facilitate processing and executing federated queries for identifying and making accessible, actionable, and operational data associated with or generated by residential, commercial, and/or industrial systems are discussed herein. Efficient and effective data processing gains are realized through a two part, sequential federated query process. In various embodiments, the sequential federated query accesses, filters, processes, translates, queries, and/or performs operations on a Contextual-Characteristic Data Source (CCDS) and a Transactional-Unstructured Data Source (TUDS). A CCDS data organization may include data such as protocols, usage, physical quantities, or topography relationships as well as ontologies specific to the application such as data center, buildings, or smart grid. A TUDS data organization may include data such as a Time Series ID, a time and date stamp, and/or a parameter value. Further, unstructured or multi-structured data may also be contained within a TUDS.

Methods and systems are disclosed for a sequential federated query for information in a residential, commercial, and/or distributed system. A method of processing a sequential federated query for distributed systems may comprise receiving a sequential federated query; deconstructing the sequential federated query into query elements; identifying a Contextual-Characteristic Data Source (CCDS), a Transactional-Unstructured Data Source (TUDS), and a data organization parameter based on the query elements; generating a CCDS result data set from the CCDS based on the data organization parameter; processing the CCDS result data set to develop a TUDS query based on the data organization parameter; generating a TUDS result data set from the TUDS based on the developed TUDS query and the data organization parameter; generating a final sequential federated query data set based on the TUDS result data set and the data organization parameters; processing a formatted sequential federated query data set based on the processing of the final sequential federated query data set and the data organization parameter; and providing the formatted sequential federated query data set to a management system for action.

Principles of the disclosure contemplate receiving the sequential federated query is initiated from at least one of a user, and a system. Further, receiving the sequential federated query is from at least one of a database, a user interface, and an application interface.

In some embodiments of the disclosure, the query elements are contextual based and may comprise data locations or data operations.

In some embodiments of the disclosure, a plurality of Contextual-Characteristic Data Source (CCDS), Transactional-Unstructured Data Source (TUDS), or data organization parameter based on the query elements are utilized.

Further embodiments of the disclosure contemplate, the CCDS result data set includes operational anomaly data generated by connected elements. Additionally, a TUDS result set is in time series data, time series state data, time stamp data or, unstructured data format. Further, the management system for action may be a Building Management System (BMS).

Principles of the disclosure contemplate a non-transitory computer readable medium storing sequences of computer-executable instructions for processing a sequential federated query for distributed systems, the sequences of computer executable instructions including instructions that instruct at least one processor to, receive a sequential federated query, deconstruct the sequential federated query into query elements, identify a Contextual-Characteristic Data Source (CCDS), a Transactional-Unstructured Data Source (TUDS), and a data organization parameter based on the query elements, generate a CCDS result data set from the CCDS based on the data organization parameter, process the CCDS result data set to develop a TUDS query based on the data organization parameter, generate a TUDS result data set from the TUDS based on the developed TUDS query and the data organization parameter, generate a final sequential federated query data set based on the TUDS result data set and the data organization parameters, process a formatted sequential federated query data set based on the processing of the final sequential federated query data set and the data organization parameter, and provide the formatted sequential federated query data set to a management system for action.

In some embodiments, at least one processor is further configured to receive the sequential federated query is initiated from at least one of a user, or a system. Further, at least one processor is further configured to receive the sequential federated query is from at least one of a database, a user interface, and an application interface.

In some embodiments, at least one processor is further configured that the query elements are contextual based and may comprise data locations or data operations.

In some embodiments, at least one processor is further configured that a plurality of Contextual-Characteristic Data Source (CCDS), Transactional-Unstructured Data Source (TUDS), or data organization parameter based on the query elements are utilized.

Principles of the disclosure contemplate, at least one processor is further configured that the CCDS result data set includes operational anomaly data generated by connected elements. Additionally, at least one processor is further configured that the TUDS result set is in time series data, time series state data, time stamp data or, unstructured data format. Further, at least one processor is further configured that the management system for action is a Building Management System (BMS).

BRIEF DESCRIPTION OF THE DRAWINGS

These accompanying drawings are not intended to be drawn to scale. In the drawings, each identical or nearly identical component that is illustrated in various figures is represented by a line numeral. For purposes of clarity, not every component may be labeled in every drawing. In the drawings:

FIG. 3 illustrates an exemplary deployment of heterogeneous hardware connected elements of a system providing data for executing a sequential federated query in accordance with various embodiments of this disclosure;

FIG. 4A illustrates an exemplary data organization construct of a system providing data for executing a sequential federated query in accordance with various embodiments of this disclosure;

FIG. 4C illustrates an exemplary Transactional-Unstructured Data Source (TUDS) data organization construct of a system providing data for executing a sequential federated query in accordance with various embodiments of this disclosure;

FIG. 5 illustrates a block diagram of system components for executing a sequential federated query in accordance with various embodiments of this disclosure;

FIGS. 6A and 6B is a flow diagram illustrating methods executing a sequential federated query method in accordance with various embodiments of this disclosure;

DETAILED DESCRIPTION

Figure 1:
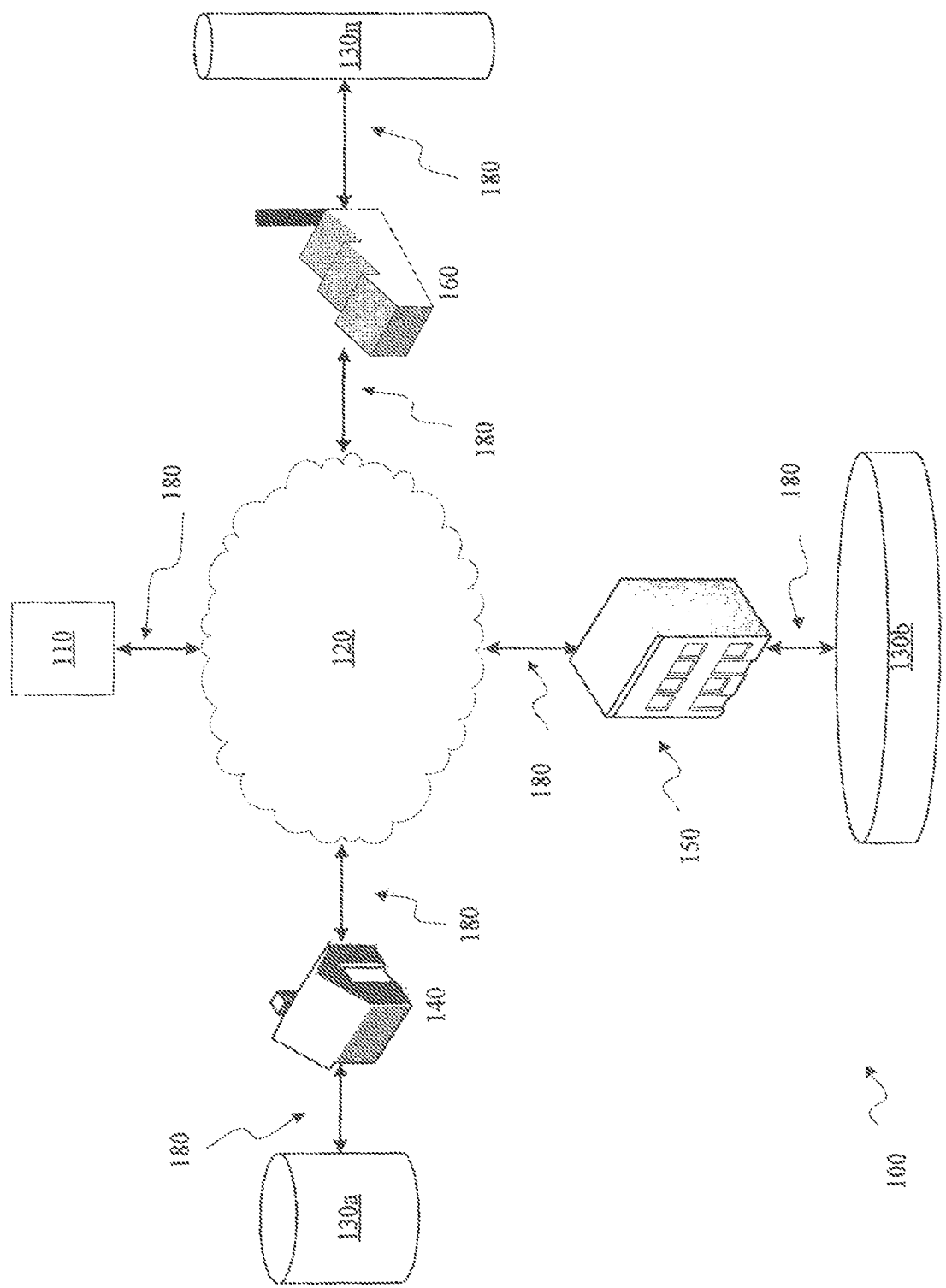
FIG. 1 illustrates aspects of a system for executing a sequential federated query in accordance with various embodiments of this disclosure.

This disclosure is not limited in its application to the details of construction and the arrangement of components set forth in the following descriptions or illustrated by the drawings. The disclosure is capable of other embodiments and of being practiced or of being carried out in various ways. In addition, the phraseology and terminology used herein is for the purpose of descriptions and should not be regarded as limiting. The use of "including," "comprising," "having," "involving," and variations herein, are meant to be open-ended, i.e. "including but not limited to."

In the emerging world of the Internet of Things (IoT) or more generally, Cyber Physical Systems (CPS), a convergence of multiple technologies is underway to allow the sensing, actuation, data capture, storage, or processing of data from a large array of connected elements. These connected elements may be accessed remotely using existing network infrastructure to allow for efficient and effective Machine-to-Machine (M2M) and Human to Machine (H2M) communication. During this communication, as the network of connected elements changes and collects data over time, a tremendous amount of data from these connected elements as well as external sources will be generated, stored, and allow for correlations that have not been possible before. Issues organizing, making accessible, analyzing, operating, and acting on dynamic sets of connected elements are exacerbated by the disparate heterogeneous nature of the underlying hardware and corresponding associated data structures.

Data volume, variety, and velocity are all increasing at a rate well beyond the ability for most computational systems to effectively and efficiently organize and analyze past, present, and future data for action using available methods. A present need exists for the ability to process, request, and analyze data from heterogeneous sources from both connected elements of a defined system and the truly massive amount of data available online, in order to make efficient, effective, operational, and actionable data correlations. It should be appreciated the disclosed method and system is not a mere presentation of available data, but a method and system which facilitates the organization of data sets directed to the technical problem of searching and correlating vast amounts of data to provide actionable information to a system or user which through automation may be acted upon.

Each individual connected element may have different hardware implementations that generate different values, units, or parameters. Connected elements may also have characteristics such as protocols, usage, physical quantities, or topography relationships as well as contextual data specific to the application, such as data center, buildings, or smart grid. While connected elements may contain characteristics to form a data structure that are similar to other individual or group of connected elements, invariably a system will contain heterogeneous connected elements and associated data structures. Yet, even with similar data characteristics, efficient and effective queries which span large physical networks and associated transactional-unstructured data related to these across different connected elements is a significant challenge. One method to solve this problem of data heterogeneity involves the implementation and execution of a method for sequential federated queries.

A sequential federated query allows a query to be processed, and provide actionable, operational results by sequentially querying more than one data source. Use of a sequential federated query, when the data sources are ordered and sequenced solves two distinct issues. The first solution addresses the issue of data heterogeneity. A second solution addresses processing the large amount of transactional-unstructured data available to determine an actionable or near real time actionable result or solution sets.

First, data heterogeneity occurs when connected systems containing diverse hardware, data structures, and/or characteristics are aggregated for a user, cloud platform, and/or another repository. Data structures and the underlying data may be mismatched. It is necessary to normalize this heterogeneous data and allow uniform comparisons to be made to other data that originated in other structures or formats.

Second, is the integration of the huge amount of transactional-unstructured data that may exist as part of a defined system or as structured or unstructured data without relation to a defined system. This data may come from the connected elements of a monitored system, or may be from an external source to be analyzed for potential data correlations. Searching such massive amounts of data, sometimes called "data warehouses" or "data lakes", in an efficient and effective way to determine actionable, operational results in real time or near real time actionable results, is highly desirable. The system may also be deployed to facilitate efficiencies and generate actionable, operational results in less time sensitive applications.

Example applications of this method may include, but are not limited to: (1) managing a building HVAC system to assure the comfort of the occupants, (2) maintenance of an office environmental air quality (which may include temperature, humidity, and carbon dioxide content) and dynamically adjusting an office environment according to the prevailing weather conditions, (3) management of a factory floor through monitoring and controlling day to day operations, maintenance, and oversight of facility operations. Commercial embodiments of such applications may be implemented as a part of a home, building, or industrial automation system.

It is to be understood that the system described herein facilitates significant flexibility in terms of configuration, features, functionality, and/or end user application and although several examples are described, a number of alternative embodiment configurations and implementations are possible.

FIG. 1 illustrates aspects of a system that facilitates generation of and/or execution of a sequential federated query 100. The system for a federated query method may include one or more processing systems 110 and a cloud-computing environment 120. Connected to a cloud-computing environment 120 are various building types such as residential, commercial, and/or industrial buildings (140, 150, and 160 respectively). Each building may have associated data storage arrays (130a, 130b, and 130n respectively). One or more connected elements (shown in FIG. 2) are associated with these buildings, as are network connections 180 to allow the exchange of data between parts of the system.

There are no limitations implied to the type or number of buildings comprising a system for a sequential federated query method 100. Embodiments for example, may include a residence 140 and an associated data storage array 130a, office buildings 150 and an associated data storage array 130b, or industrial installations 160 and an associated data storage array 130n. Each building may maintain a network connection 180 to the cloud-computing environment 120 and from the connected elements in each building to each storage array via a network connection 180. It should be appreciated various parts of a system for a sequential federated query method 100 facilitate co-located or remote storage or processing solutions. For example, a data storage array 130a for a residence 140 may be located within the residence 140 itself, outside yet nearby, in the cloud-computing environment 120, and/or distributed across one or more storage nodes.

In one embodiment of the system illustrated in FIG. 1, the building 150 contains one or more connected elements that perform sensing, actuation, data capture, storage, or processing for the monitoring or management of the building 150. Any variety of connected elements may be used to capture, store, process data, actuate, and/or operate associated devices over the network connections 180, to the cloud-computing environment 120, to other parts of the system. These connected elements may include hardware, modules, and/or sensors.

For example, connected elements, sensors, or hardware may be configured for detecting temperature, humidity, ambient light, sound, smoke, carbon monoxide, carbon dioxide, motion, non-conductive fluids, conductive fluids, vibration, energy, power, voltage, current, or any other desired characteristic, and combination thereof. Connected elements may also operate, control, or articulate other connected elements, components, and/or other systems, such as turning on lights, opening a door or window, moving window shades, or triggering a door lock. Connected elements may possess ability to process data from other connected elements or propagate data from one or more connected elements to one or more other connected elements. Such hardware processing ability may be in addition to, or as a substitute for, measuring the environmental parameters through a sensor. Any number of connected elements may be deployed in any combination to monitor or manage a physical space, including for example a closet, room, residence, commercial building, campus, office, promenade, industrial setting, or any other desired location.

Each building containing a connected element may ultimately connect to a cloud-computing environment 120 through a network connection 180. This network connection 180 allows access to the cloud-computing environment 120 by a variety of devices capable of connecting to such an environment in either a wired or wireless connection manner. From FIG. 1, such devices may include one or more processing systems 110 capable of receiving input from a user or to provide autonomous operation. One or more associated data storage arrays 130a, 130b, 130n may be utilized to provide additional data storage capability of contextual-characteristic data, transactional-unstructured data, or both. It should be appreciated a cloud computing environment 120, while providing additional communication paths to additional connected elements or systems, is not required as part of the sequential federated query method. Embodiments contemplate self-contained, stand-alone, or distributed systems.

Figure 2:
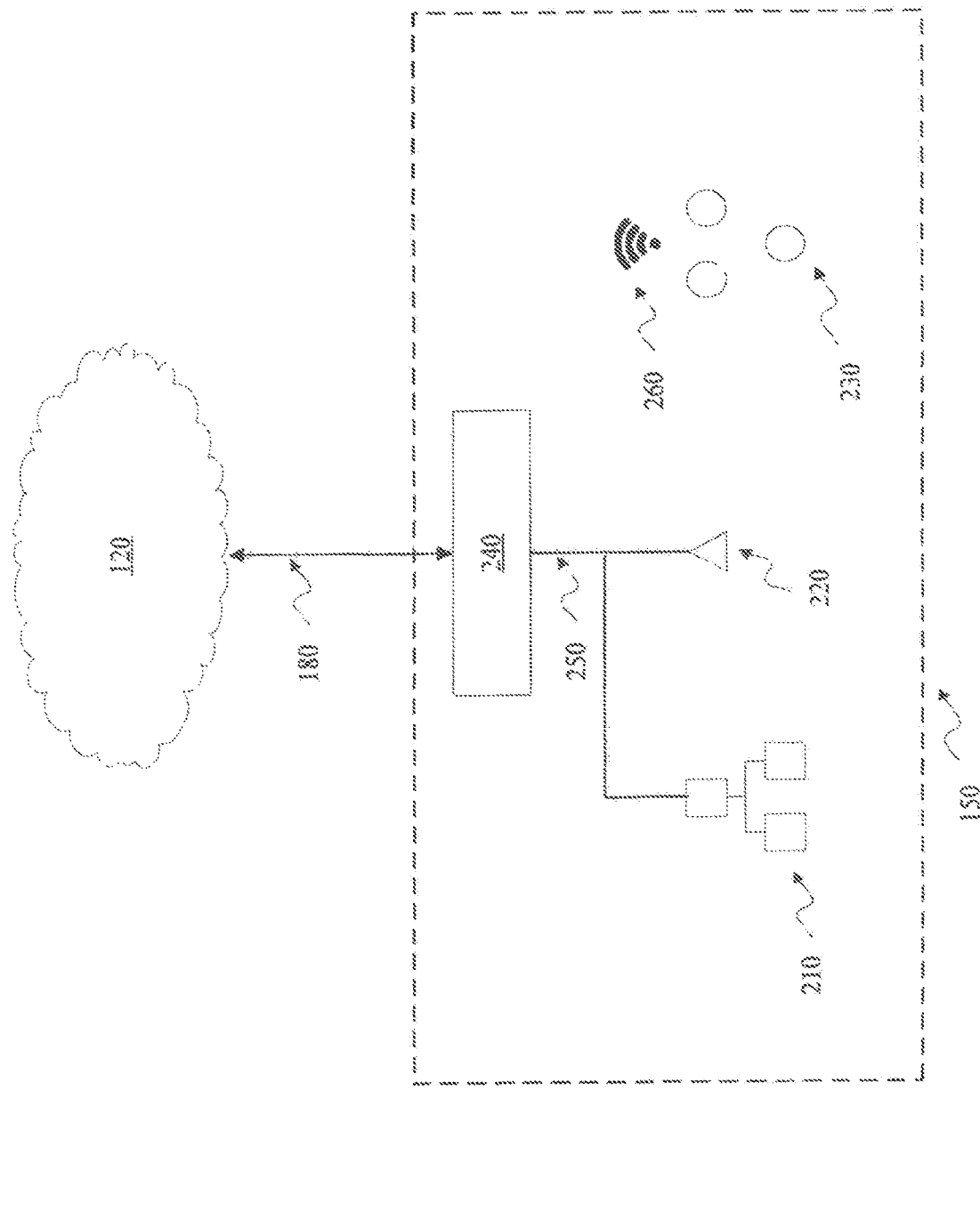
FIG. 2 illustrates aspects of heterogeneous hardware connected elements may connect to a system for executing a sequential federated query in accordance with various embodiments of this disclosure.

FIG. 2 illustrates aspects of heterogeneous hardware connected elements connected to a system for executing a sequential federated query 200 in accordance with various embodiments of this disclosure. In one embodiment, the building 150 contains one or more types of connected elements 210, 220, 230, 240 for the monitoring or management of the structure. These connected elements 210, 220, 230, 240 communicate via a wired network connection 250 or wireless network connection 260 networks and makes the data structures from each connected element available to the cloud environment 120 via the network connections 180. The network connections 180 may include wired and/or wireless connection types.

For example, such connections may include, but are not limited to, any physical cabling method such as category 5 cable, coaxial, fiber, copper, twisted pair, or any other physical media to propagate electrical signals. Wireless connections may include, but are not limited to personal area networks (PAN), local area networks (LAN), Wi-Fi, Bluetooth, cellular, global, or space based communication networks. Access between the cloud environment 120 and any other cloud environment is possible in other implementations these other cloud environments are configured to connect with devices similar to cloud environments such as the existing cloud environment 120. It is to be understood that the computing devices shown in the figures and discussed herein are intended to be illustrative only and that computing nodes and cloud computing environments may communicate with any type of computerized device over any type of network with addressable or direct connections.

Any variety of connected elements may be used to perform organizing, making accessible, analysis, and operating or sensing, actuation, data capture, storage, or processing over the network connection 180, to the cloud-computing environment 120, to other parts of the system. Accordingly, these devices may have different data parameters, fields, units, or general overall data structure associated with each device, respectively.

For example, as illustrated in FIG. 2, connected elements 210 may be connected sensors to measure carbon dioxide for monitoring air quality of the building 150 and communicate via a wired network connection 250. Connected elements may be both configured to acquire data and control various modules for example a connected sensor to detect ambient light and an actuator connected element 220 are implemented to change the state of an occupant light fixture and communicate via a wired network connection 250. Connected elements may be connected sensors for temperature and humidity connected element 230 to monitor environment of the building 150 and communicate via a wireless network connection 260. Finally, connected element 240 serves as a connected gateway to communicate with the associated connected elements 210, 220, 230, via their respective network connections 250, 260, process the data structures of each, and transmit it to a network connection 180 for transmission to the cloud environment 120. It should be appreciated a cloud computing environment 120, while providing additional communication paths to additional devices or systems, is not required as part of the sequential federated query method. Other embodiments contemplate self-contained, stand-alone systems, and/or distributed systems.

These connected elements need not be geographically localized or logically grouped in any way to utilize embodiments of this disclosure. Grouping connected elements geographically or logically may allow more economic use. A geographic grouping such as in an apartment, home or office building may be accomplished, as well as logically locating connected elements by function. One of many logical grouping examples may be locating connected end points designed to sense temperature, proximate to an occupied location to detect changes in environment. It should be appreciated that the groupings of connected endpoints may also be located on a very large geographic scale, even globally. Such global operations may be monitored through a network located in any number of facilities around the globe.

FIG. 3 illustrates an exemplary deployment of heterogeneous hardware connected elements of a system 300 providing data for executing a sequential federated query in accordance with various embodiments of this disclosure. A building 310 having (3) floors are illustrated. Floor (1) 312, Floor (2) 314, Floor (3) 316 are contained within the building 310. In FIG. 3, each floor has (3) connected elements of different types. For example, connected elements may be connected sensors to measure carbon dioxide 330, 332, 334 for monitoring air quality of the building 310 and communicate via a wired network connection. Connected elements may be both a connected sensor to detect ambient light and an actuator 340, 342, 344 to change the state of an occupant light fixture and communicate via a wired network connection. Connected elements may be connected sensors for temperature and humidity 350, 352, 354 to monitor environment of the building 310 and communicate via a wireless network connection.

Given the configuration illustrated in FIG. 3, each connected element possesses a contextual-characterization data structure that includes, but not be limited to, sensor specific information (temperature/humidity, carbon dioxide, and ambient light), geographic information (zone, floor, building), and network information (MAC address, IP address, wired, wireless). Other connected element information may be available as well as information relative to the operation of the connected element itself. As one example, a status of online or offline may be available to further add to the data construct for each connected element.

Further, each connected element may possess a transactional-unstructured data structure that includes, but not limited to, sensor specific information (temperature/humidity values, carbon dioxide, and ambient light in the present example), that is stored on a time, state, or unstructured basis. In this way, each connected element has a history associated with it. This history, or "data log", may be used in determining trends and/or operational characteristics in time for particular connected elements. Further, data from combinations of history of various connected elements may analyze for trends and/or operational characteristics for a particular geographic space, system, and/or group of systems such as a building. Use of transactional-unstructured data is expected to grow in time and as such, a need for efficient query handling to allow the efficient and effective querying of this ever expanding "data lake."

Methods and systems that facilitate processing and executing federated queries for identifying and making accessible, actionable, and operational data associated with or generated by residential, commercial, and/or industrial systems. Efficient and effective data processing gains are realized through executing a two part, sequential federated query. As a result of collecting data in this manner on a wide variety of connected elements, both contextual-characteristic data and transactional-unstructured data will be available to a user or system for analysis, structure, control, and/or connected element operation. This creates a fundamental problem of how to make accessible and efficient and effectively query distinct types of data sources that may be exceedingly large for action by a user or other management system without the use of the systems described herein.

Figure 4B:
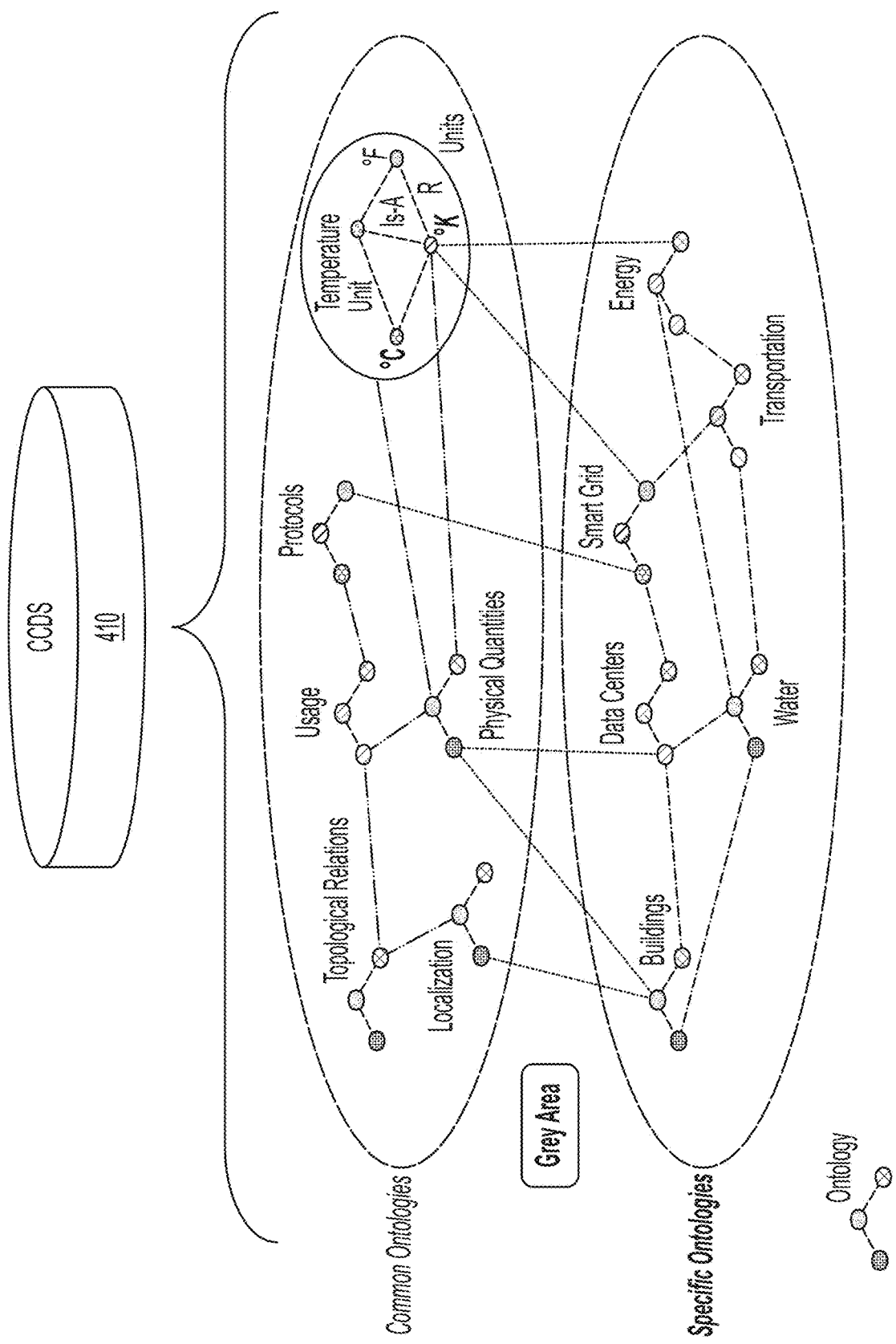
FIG. 4B illustrates an exemplary Contextual-Characteristic Data Source (CCDS) data organization construct of a system providing data for executing a sequential federated query method in accordance with various embodiments of this disclosure.

FIG. 4A illustrates an exemplary data organization construct of a system 400 providing data for executing sequential federated queries in accordance with various embodiments of this disclosure. As illustrated in FIG. 4A, one or more processing systems 110 initiates a sequential federated query through a network connection 180. The query is executed in two parts. First, is a query on a Contextual-Characteristic Data Source (CCDS) 410. An example of a CCDS is described in FIG. 4B. Second, the results from the CCDS 410 query are processed and utilized to query a Transactional-Unstructured Data Source (TUDS) 420. An example of a TUDS is described in FIG. 4C. Once processing on the data sources are completed, any actionable, operational data results and corresponding activity is executed in the appropriate physical location, such as a building 310. As one example, turning off lights in the North building that have been on for more than three hours after 5 AM without a valid occupancy sensor reading. These two steps streamline searching the massive volumes of data, to determine actionable or operational data and/or solutions.

Both exemplary CCDS 410 and TUDS 420 are utilized in the disclosed method of sequential federated queries to produce an actionable result. Embodiments of this disclose contemplate this data may be stored on a single data array, a plurality of data arrays, local, remote, cloud based, or any combination therein.

FIG. 4B illustrates exemplary CCDS 410 organization constructs of connected elements associated with a system. It should be appreciated that any connected element type in any combination may exist in any geographic location and include additional information within a respective data structure. These exemplary data organization illustrates examples of contextual-characteristic data and parameters such as protocols, usage, physical quantities, or topography relationships as well as ontologies specific and/or contextual to the application, connected element, or to the location, such as data center, buildings, or smart grid.

FIG. 4C illustrates exemplary TUDS 420 organization constructs of connected elements and associated data across a system that facilitates a sequential federated query. Embodiments of a system for sequential federated queries exist where multiple connected elements are providing contextual-characteristic data and transactional-unstructured data to the system. It should be appreciated this data may be internal to a particular system (such as a series of humidity measurements), external to a system (such as power consumption rates provided by a utility company), or both. Features of the system facilitate solving the issue created when each connected element analyzed has associated transactional-unstructured data as well as contextual-characteristic data.

This TUDS 420 include data several types as well. Time series data 430 may contain several data fields that possess a Time Series ID, or some unique identifier. Further, each time series data element may have a time and date stamp to identify the data packet to a particular moment in time. Finally, a parameter value may be associated with a time series data element to store one or more data values. Examples of time series data 430 may include measurements from a temperature sensor that over time may be graphed and plotted to show a visual curve.

Time series state data 440 is similar to time series data 430, however instead of a numeric parameter stored from a sensor, a state may be captured, such as "on" or "off" from a light sensor. An unlimited number of states may be captured per sensor, or connected element such as "high", "medium", or "low" or any of the multiple states in a Hierarchical State Machine (HSM). No limitations are implied with one type of time series data from another.

Time stamp data 450 may also exist in transactional-unstructured data where otherwise unstructured data may have an associated time stamp. An example of this data type may be email messages that are time stamped on receipt. Such transactional-unstructured data may be used in a sequential federated query to assist in data correlations for a system.

Unstructured data 460 may exist which may not have an associated time, yet may be enormously useful in a sequential federated query to assist in data correlations, analysis, operations, and/or control for a system. An example of this data type may be data associated with social media applications, images, text files, or other documents without a time stamp. Such transactional-unstructured data may be used in combination with contextual-characteristic data to form actionable correlations for a system. It should be appreciated "unstructured data" also includes "multi-structured data." In other words, several heterogeneous data structures grouped together despite data structure inconsistencies. Such data exists in a wide variety of formats and may reside both in transactional and non-transactional type systems. In general, these types of data refer to information that may not have a defined data model or are organized in a defined manner at the time the data is created.

It should be appreciated that while each connected element may have an associated contextual-characteristic data and transactional-unstructured data structure, the number of data structures connected elements may vary based on the hardware involved, the particular configuration, or application. Once the connected elements data structures are organized in this way, multi-dimensional sequential federated analysis may be performed without discrete or in depth knowledge of the physical system and the associated connected elements. Further, the foregoing are only examples of data and should not be considered limiting in any way.

FIG. 5 illustrates a block diagram of system components that organize, make accessible, analyze, operate, and act on data for executing a sequential federated query 500 in accordance with various embodiments of this disclosure. It is possible for either a user and/or an automated process from a machine to generate and submit a sequential federated query. A user or system-initiated query may begin at a processing system 110. In other implementations, a machine-initiated process may derive from any other process in the system. It should be appreciated the methods of initiation of a sequential federated query are not mutually exclusive from each other. In both cases, the sequential federated query processed by the Federated Query Handler 510, and is a structured federated query with a particular grammar. In one example, SPARQL or any other expressive query language may be utilized to provide the structured query grammar. This grammar structure may include the use of various data sources, operations such as matching or graphing, assignments, aggregating, or sub queries.

Sequential federated queries are received into the Federated Query Handler 510, illustrated in FIG. 5 as a series of modules including: A Query Deconstruction (QD) function module 520, a Data Source Identification and Processing (DSIP) function module 530, and a Result Transformation and Filtering (RTF) function module 540. Additionally, a Contextual-Characteristic Data Source (CCDS) 410 with contextual-characteristic data associated with connected elements in a structure, such as a building 310 is present, as well as a Transactional-Unstructured Data Source (TUDS) 420. It should be appreciated both data sources may reside on the same physical device, or across one or multiple systems.

The Query Decoder (QD) 520 analyzes the sequential federated query and deconstructs it into query elements. These query elements may include contextual data or operators, such as the location of any data sources to be used, operational parameters for the data, filtering to be performed on a result, and any output format.

Query elements are processed and utilized by the Data Source Identification and Processing (DSIP) function module 530, to analyze the query elements and perform operations on the translated data sources or query built from the resulting data based on the deconstructed query elements. These data sources may include CCDS 410, TUDS 420, and/or a combination of data sources. It should be appreciated, the CCDS 410 is queried first, the results processed, translated, and utilized to perform the query on the TUDS 420. Due to the divergent data storage paradigms of the CCDS and TUDS, it is necessary to process the query according to the target data source paradigm. DSIP is capable of generating a query in accordance with the targeted storage data format. Data formats include SPARQL, SQL, MongoDB query, and others.

A CCDS query will be executed by the Data Source Identification and Processing (DSIP) function module 530, and sent 550 to the CCDS 410. Once the query is complete the CCDS result data will be returned 555 to the Data Source Identification and Processing (DSIP) function module 530. Similarly, a TUDS query will be executed by the Data Source Identification and Processing (DSIP) function module 530, and sent 560 to the TUDS 420. Once the query is complete the TUDS result data will be returned 565 to the Data Source Identification and Processing (DSIP) function module 530.

Once the data has been queried in the CCDS 410 and TUDS 420, results defined by the query elements are processed and/or filtered and translated into a format specified in the initial sequential federated query by the Results Transformation and Filtering module 540. Data format examples prepared for translation may include CSV, XML, JSON, or RDF. Translated results are transmitted back to the processing system 110 for the operation or action in the respective environment, such as a building management system in execution within a building 310.

Figure 6A:
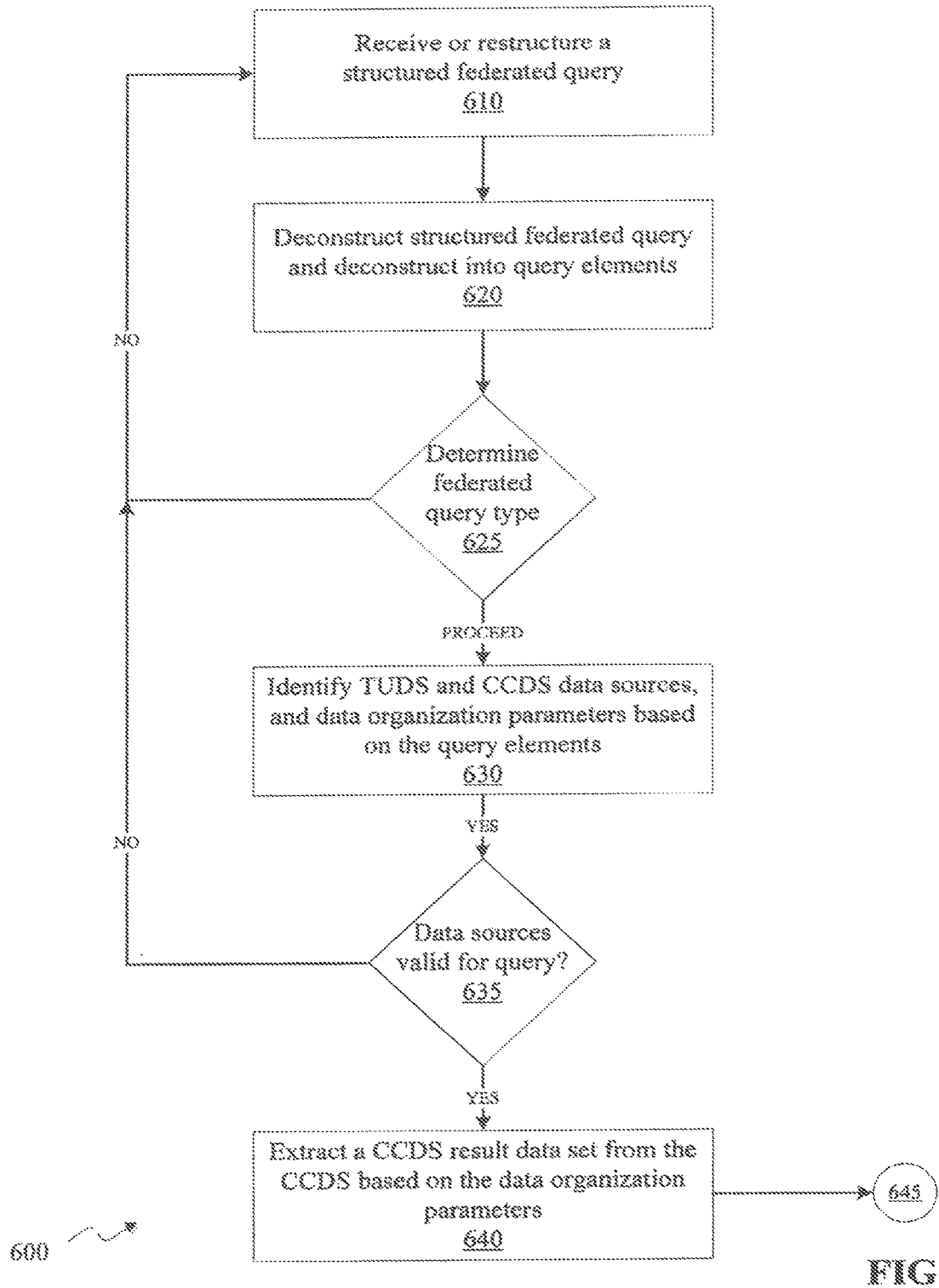

FIG. 6A and FIG. 6B are flow diagrams illustrating methods of executing a sequential federated query 600 in accordance with various embodiments of this disclosure. As discussed, a sequential federated query is received 610 from a user or processing system. This may be a manual action from a user, an automated action from another processing system, or some combination of both. It should be appreciated that more than one data source or connected elements may be the target of the sequential federated query. This includes both internal system and external data such as from a "data warehouse" or "data lake." It should be appreciated the disclosed method does not result in a mere presentation of available data, but a method which facilitates the organization of data sets directed to the technical problem of searching and correlating vast amounts of data to provide actionable information to a system or user which through automation may be acted upon.

Once received, the sequential federated query is deconstructed into its composite query elements 620. These query elements may include the location of any data sources to be used, operational parameters for the data, as well as any filtering and/or processing to be performed on a result. Once deconstructed, error checking is performed 625 to determine what sequential federated query type is being requested, and if such a request can be met based on the determined query elements. If the query elements determined do not allow the current method to proceed, the process returns to receiving the sequential federated query 610 input elements for resubmission and/or restructuring of the sequential federated query.

If the query elements are determined to support the type of query requested, the method continues by identifying the contextual-characteristic data source (CCDS), transactional-unstructured data source (TUDS), and/or any data organization parameters 630. Validation 635 is also performed to verify, in one example, if the data sources currently exist in the form or location specified in the sequential federated query. Further, a determination may be made as to the types of available data and/or if the sources are appropriate for such a query. For example, further logic may be required if a particular type of contextual-characteristic is present, or of multiple sources of transactional-unstructured exists.

Once each data source is validated 635, the contextual-characteristic data set is queried based on the data organizational parameters 640 determined from the sequential federated query. This query on the contextual-characteristic data creates a focused data set that may be applied to a large amount of data, for example data contained in a TUDS, to produce a refined data set most useful to a system user, such as a building administrator, and/or a particular system. This flow continues from FIG. 6A to FIG. 6B 645.

Once the contextual-characteristic query creates a focused data set, this data set is transformed into a transactional-unstructured query 650. It should be appreciated the order in which the data sources are queried is an important aspect to achieve the efficiencies described herein. This ordered approach of (1) contextual-characteristic source query, followed by (2) transactional-unstructured source query, facilitates the efficient search of large transactional-unstructured data set by substantially focusing, in step (1), the amount of transactional-unstructured data required to be queried, in step (2).

From the query results from the transactional-unstructured data set, a raw data set is extracted based on the results from the data sources and the data organization parameters 660. From this raw data set, a refined data set will be created 670 in a transactional-unstructured format such as time series data 430, time series state data 440, time stamp data 450 or, unstructured data 460. This result data set is then processed and/or filtered based on the query parameters and transformed to form a final data set 680. Data format examples prepared for translation may include CSV, XML, JSON, or RDF.

This final data set is then validated 685 to determine what actions, operations, or analysis may be taken based on the result data. If these actions are determined to be valid, they may be transmitted to a user or a management system, such as a building management system to take autonomous action based on the results from the sequential federated query 690. If these actions are determined not to be valid, processing returns to receiving sequential federated queries 695 for resubmission.

Figure 7:
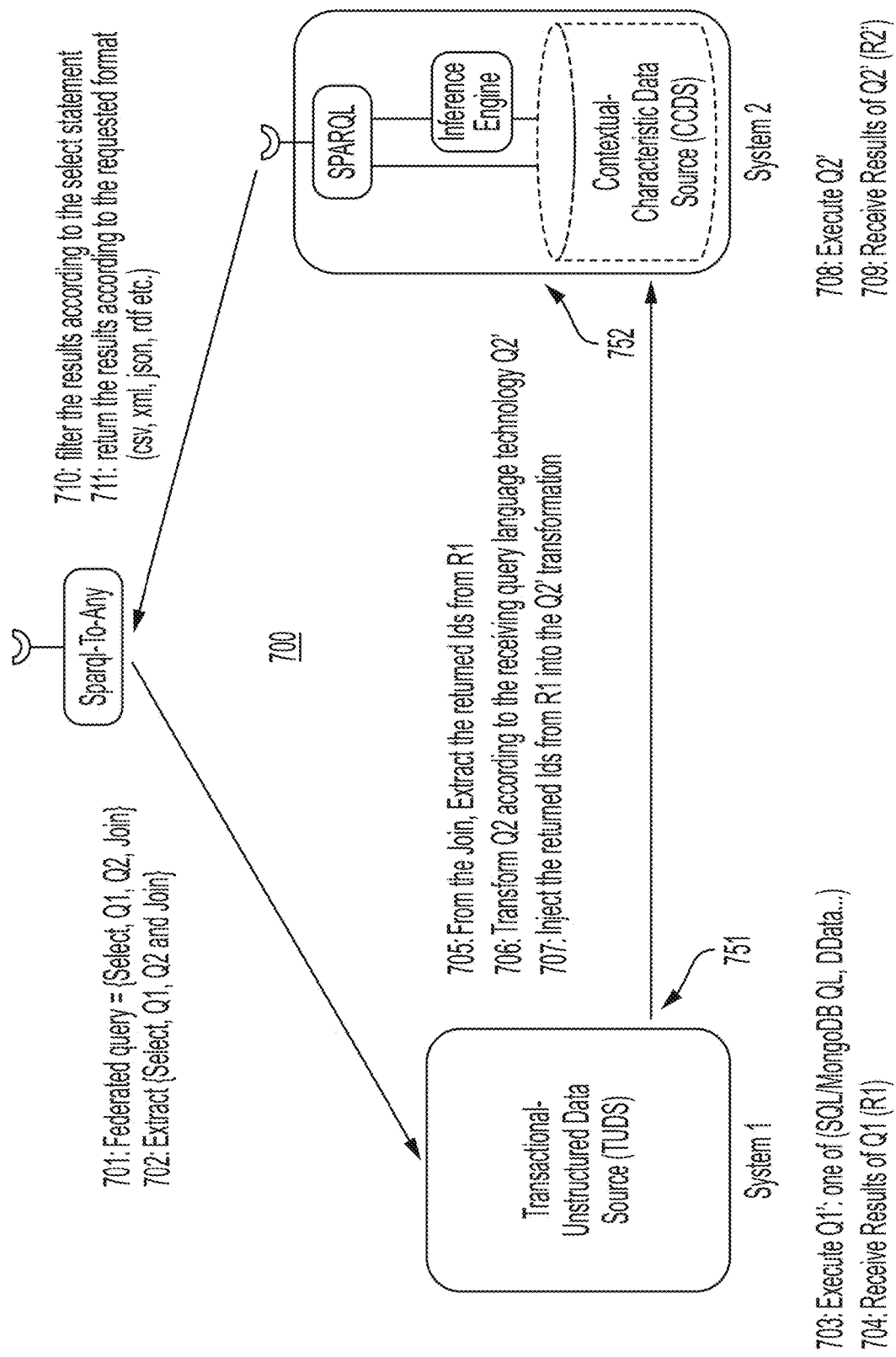
FIG. 7 illustrates an example system for data organization and processing flow diagram for executing a sequential federated query in accordance with various embodiments of this disclosure.

FIG. 7 illustrates an exemplar system for data organization and processing flow diagram 700 for executing a sequential federated query in accordance with various embodiments of this disclosure. Embodiments of this system illustrate a sequential federated query received upon input from a user or processing system. Creation of the sequential federated query may be a manual action from a user, an automated action from another processing system, or some combination of both 701. A sequential federated query may utilize languages such as SPARQL, SQL, or MongoDB, to query any contextual-characteristic data source 751, illustrated in FIG. 7 as "System 1".

One received, the sequential federated query is deconstructed into its composite query elements 702. These query elements may include the location of any data sources to be used, such as the Contextual-Characteristic Data Source (CCDS) data sources within "System 1" 751 or Transactional-Unstructured Data Source (TUDS) data sources, illustrated in FIG. 7 as "System 2" 752. Operational parameters for the data, as well as any filtering to be performed on a result may also be included in the query elements.

A query is performed 703 on the CCDS of "System 1" 751 based on the query elements deconstructed from the initial sequential federated query 702. These contextual-characteristic based results from the CCDS query performed on "System 1" are received 704 by the system, processed 705, and translated into a transactional-unstructured data format 706 such as SQL or XQuery, MongoDB, or others.

Now translated in a transactional-unstructured data format 706, these results are injected as a query 707 into the TUDS of "System 2" 752. This query may be formatted as SQL, MongoDB, XQuery, or any other query language. This query result is processed 708 by "System 2" 752 and the result 709 yields data in a transactional-unstructured data format, yet with reference to the previously specified contextual-characteristic data only. It is here the efficient and effective data processing gains are realized through this two part sequential federated query process. Executed in this sequential order, the system facilitates the processing and execution of sequential federated queries for identifying and making accessible, actionable, and operational data associated with or generated by residential, commercial, and/or industrial systems in an efficient and effective way.

Results from the query into the TUDS of "System 2" 752 are returned to the system and processed and/or filtered 710 according to the initial sequential federated query parameters. Finally, the results are translated into the format requested 711, which may include CSV, XML, JSON, RDF. This format may be used by human and/or machine as a method to generate actions derived from the resultant data.

Figure 8:
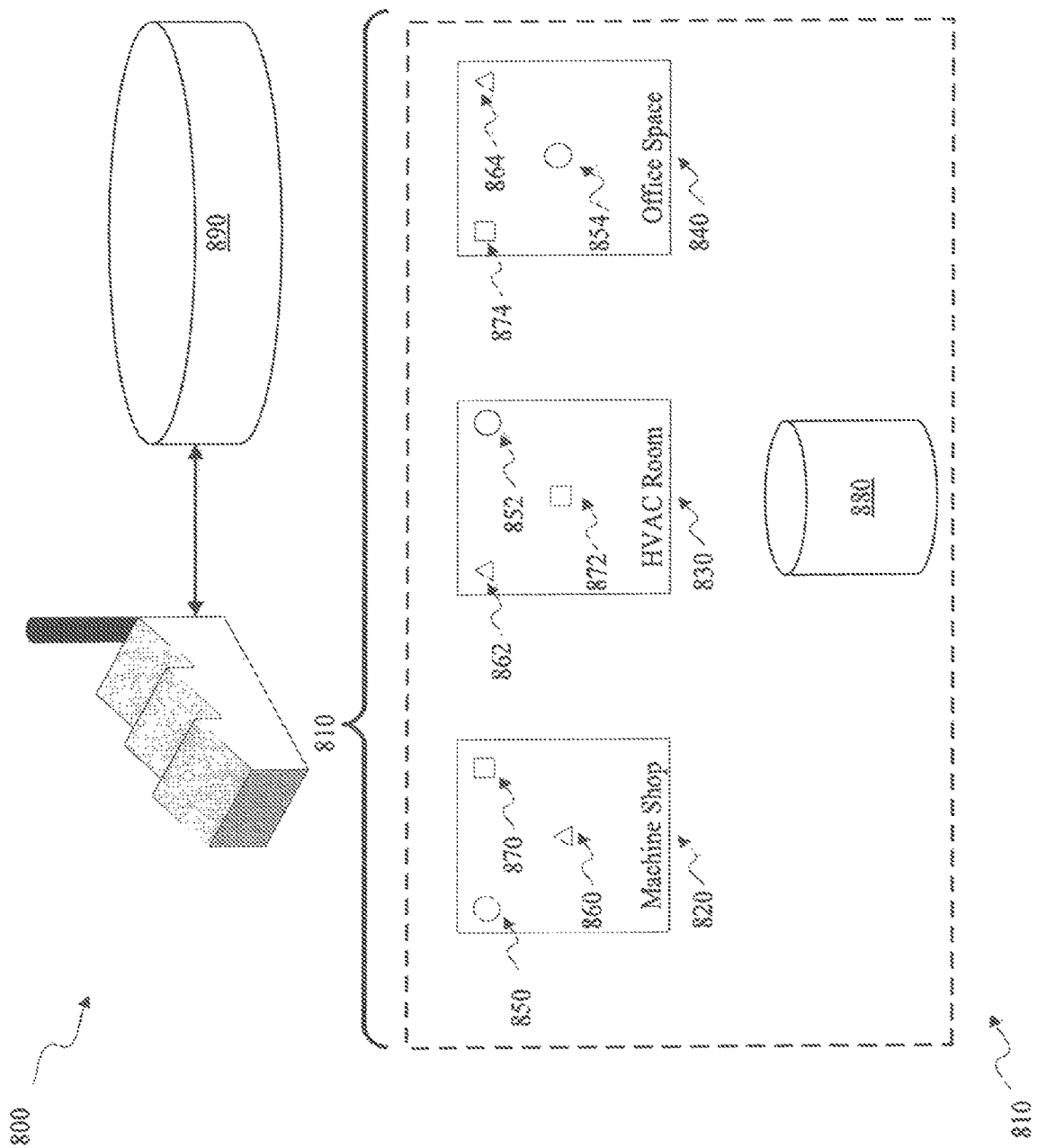
FIG. 8 illustrates an exemplary system providing data for executing a sequential federated query method in accordance with various embodiments of this disclosure.

FIG. 8 illustrates a working example 800 of the processing steps from FIG. 7 implementing an industrial building facility and energy management system. An industrial building 810 having three distinct building sections illustrated including: a machine shop 820, HVAC Room 830, and Office Space 840. Each distinct building section has three connected elements of different types, including carbon dioxide sensor connected elements 850, 852, 854 and connected sensors to detect occupancy/actuate for lighting 860, 862, 864. Connected elements may be connected sensors for power measurement 870, 872, 874 to monitor energy consumption of the sections of the building 810. Such a system also has a CCDS 880 to provide contextual-characteristic data specifically about the building 810 and the connected elements contained therein. The CCDS 880 may be contained within the building 810, be in a remote location, and/or cloud based. Further, a TUDS 890 that may be in a remote location or cloud based is also connected to the system through a network connection to provide transactional-unstructured data to the system.

As one of many examples, a Building Management System (BMS) may be programmed by a user to measure and maintain certain levels of air quality. It should be appreciated this may also be accomplished by a system through the use of a pre-defined rule to measure and maintain certain level of air quality through sensors, building air handling, and/or HVAC systems. This air quality level may be programmed to vary based on the section of the building monitored. A carbon dioxide level of 1000 Parts per Million (ppm) may be set as the upper limit for all spaces within the building 810 whenever the particular sections 820, 830, 840 of the building are occupied. However, if the entire building is unoccupied, the carbon dioxide levels may be allowed to rise to a maximum of 5000 ppm to conserve energy by efficiently running the air handler system only when people are within the building. If an occupant is detected, there must be an immediate remediation of the carbon dioxide levels within acceptable occupational levels. Such a remediation is accomplished by the activation of the air handling system for the building 810.

A single BMS may be responsible for managing several buildings similar to the example building 810. In order to efficiently and effectively manage and control all the connected sensors and their associated air handling and/or HVAC systems in all the connected buildings, as well as, utilize transactional-unstructured data; a sequential federated query can be utilized. As such the BMS responsible for maintaining air quality in the building 810 utilizes a sequential federated query provided by a the system to (1) determine occupancy of the building 810 through processing data from the connected sensor to detect occupancy 860, 862, 864, (2) determine the current carbon dioxide levels through processing data from the carbon dioxide sensor connected elements 850, 852, 854, (3) correlate the measured carbon dioxide readings to sets of transactional-unstructured data, and (4) translate the resulting data set to execute remediation actions such as activating the air handling system to reduce level of carbon dioxide in those areas where air handling activation is appropriate.

As the BMS continuously processes such a sequential federated query, the CCDS 880 is queried for data specifically regarding the building 810. Once this data is extracted from the CCDS, it is processed and translated into a transactional-unstructured data format, and injected as a query into the TUDS 890. As a direct result of this querying and processing of the CCDS 880 and TUDS 890 in sequence, should the building or sections of it be occupied for a given duration, and the carbon dioxide levels are above the stated maximum, the BMS will initiate autonomous action to remediate the air quality.

In another example, all connected sensors for power measurement 870, 872, 874 of each part of the building 810 are monitored on a periodic basis. CCDS 880 data exists for these sensors which provides contextual-characteristic data such as sensor is location, and periodic data is stored with an energy measurement for a given time, in a TUDS 890. Should a building operator be tasked to understand power consumption data for a period of time and determine the maximum use case to predict future use, a sequential federated query can be used to retrieve this data efficiently.

In such a case, the building operator will create a sequential federated query that specifies connected sensors for power measurement 870, 872, 874. Additionally, the user may also specify the CCDS 880 and TUDS 890 to be used as well as other parameters such as the particular time frame to be queried and to provide total power consumption numbers as well as filter on maximum power consumption results.

Such a sequential federated query will query the CCDS 880 for the contextual-characteristic data for the sensors for power measurement 870, 872, 874, and in turn, process and translate that data to query the TUDS 890 for the particular timeframe desired. Once the query on the TUDS 890 is completed and processed and/or filtered as described in the initial sequential federated query, the result will be returned to the user for action, in this example, may include planning activities for the building 810.

In another example, a sequential federated query may be performed to determine which, if any, connected elements have become inoperable or are otherwise malfunctioning. In such a sequential federated query, a user or system may correlate a comparison of all, or some subset of connected elements, such as connected elements 854, 864, 874, in the office space 840 of the building 810. While the CCDS 880 data will remain constant if the configuration of connected elements has not changed, comparison of TUDS 890 data for each connected element 854, 864, 874 may fail to produce TUDS 890 data, such as online status or discrete temperature/humidity measurements on the periodic basis previously defined. This type of sequential federated query allows a maintenance operator to determine issues and subsequent actions in a timely fashion for a very large and heterogeneous distribution of connected sensors.

In this way manual, autonomous, or near real time autonomous actions, and/or controls may be executed given one or more environmental considerations as determined by contextual-characteristic data type data. Such environmental considerations are monitored through heterogeneous connected elements and correlated with large volumes of transactional-unstructured data. These described systems and methods facilitate processing and executing sequential federated queries for identifying and making accessible, actionable, and operational data associated with or generated by residential, commercial, and/or industrial systems. Efficient and effective data processing gains are realized through this two part, sequential federated query process.

It should be appreciated the disclosed method and system is not a mere presentation of available data, but a method and system which facilitates the organization of data sets directed to the technical problem of searching and correlating vast amounts of data to provide actionable information to a system or user which through automation may be acted upon.

Any processing systems used in various embodiments of this disclosure may be, for example, processing systems such as those based on Intel PENTIUM-type processor, Motorola PowerPC, Sun UltraSPARC, Hewlett-Packard PA-RISC processors, or any other type of processor.

Figure 9:
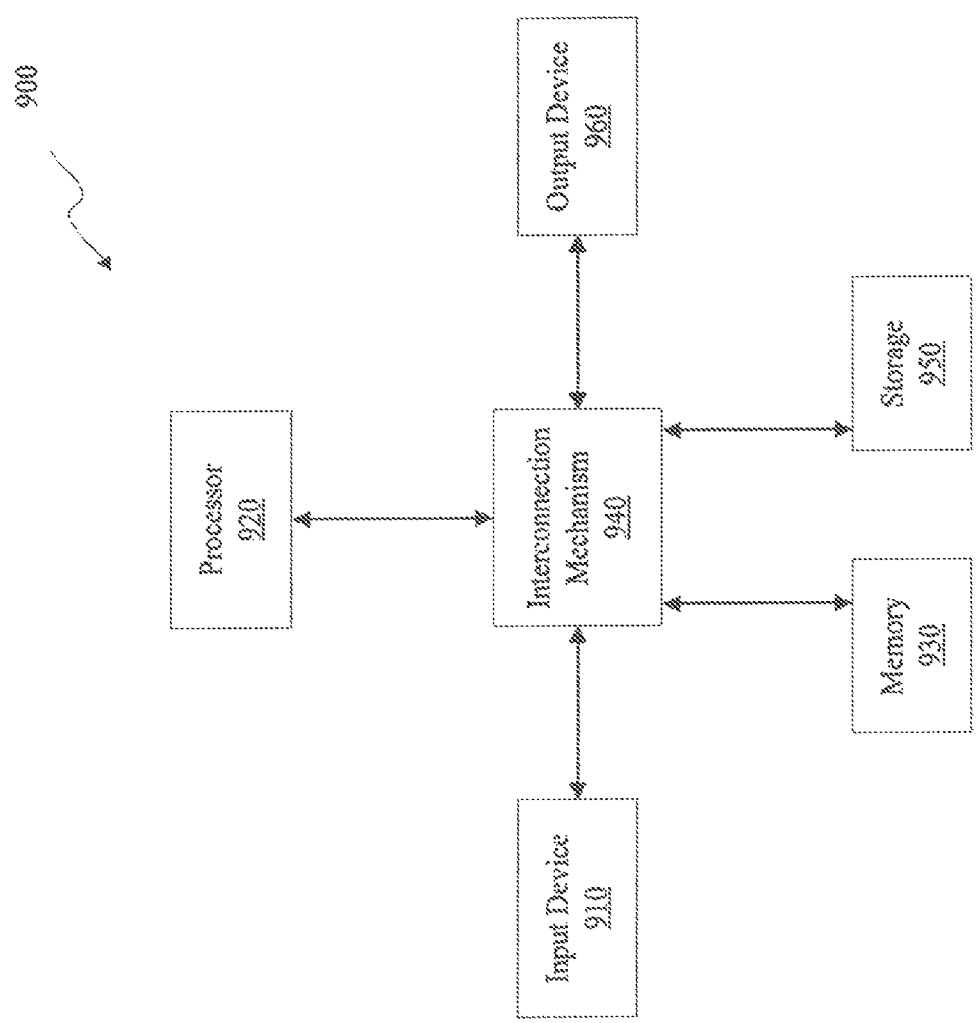
FIG. 9 is a functional block diagram of a processing system in accordance with embodiments of this disclosure.

For example, various embodiments of the disclosure may be implemented as specialized software executing in a processing system 900 such as that shown in FIG. 9. The processing system 900 may include a processor 920 connected to one or more memory devices 930, such as a disk drive, memory, or other device for storing data. Memory 930 is typically used for storing programs and data during operation of the processing system 900. The processing system 900 may also include a storage system 950 that provides additional storage capacity. Components of processing system 900 may be coupled by an interconnection mechanism 940, which may include one or more busses (e.g., between components that are integrated within the same machine) and/or a network (e.g., between components that reside on separate discrete machines). The interconnection mechanism 940 enables communications (e.g., data, instructions) to be exchanged between system components of system 900.

Processing system 900 also includes one or more input devices 910, for example, a keyboard, mouse, trackball, microphone, touch screen, and one or more output devices 960, for example, a printing device, display screen, speaker. In addition, processing system 900 may contain one or more interfaces (not shown) that connect processing system 900 to a communication network (in addition or as an alternative to the interconnection mechanism 940).

Figure 10:
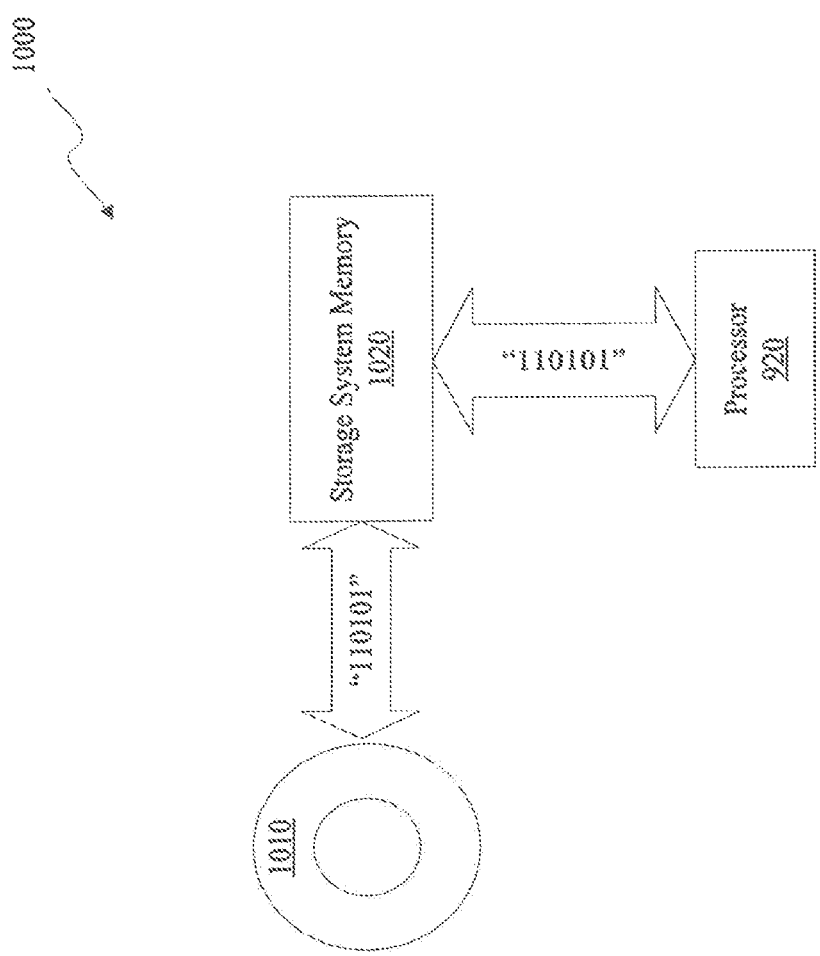
FIG. 10 is a functional block diagram of a processing storage system in accordance with the processing system of FIG. 9.

The storage system 950, shown in greater detail in FIG. 10, typically includes a computer readable and writeable nonvolatile recording medium 1010 in which signals are stored that define a program to be executed by the processor or information stored on or in the medium 1010 to be processed by the program to perform one or more functions associated with embodiments described herein. The medium may, for example, be a disk or flash memory. Typically, in operation, the processor causes data to be read from the nonvolatile recording medium 1010 into another memory 1020 that allows for faster access to the information by the processor than does the medium 1010. This memory 1020 is typically a volatile, random access memory such as a dynamic random access memory (DRAM) or static memory (SRAM). It may be located in storage system 1000, as shown, or in memory system 930. The processor 920 generally manipulates the data within the integrated circuit memory 930, 1020 and then copies the data to the medium 1010 after processing is completed. A variety of mechanisms are known for managing data movement between the medium 1010 and the integrated circuit memory element

930, 1020, and the disclosure is not limited thereto. The disclosure is not limited to a particular memory system 930 or storage system 950.

The processing system may include specially programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the processing system described above or as an independent component.

Although processing system 900 is shown by way of example as one type of processing system upon which various aspects of the disclosure may be practiced, it should be appreciated that aspects of the disclosure are not limited to being implemented on the processing system as shown in FIG. 10. Various aspects of the disclosure may be practiced on one or more computers having a different architecture or components shown in FIG. 10. Further, where functions or processes of embodiments of the disclosure are described herein (or in the claims) as being performed on a processor or controller, such description is intended to include systems that use more than one processor or controller to perform the functions.

Processing system 900 may be a processing system that is programmable using a high-level computer programming language. Processing system 900 may be also implemented using specially programmed, special purpose hardware. In processing system 900, processor 920 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 7, Windows 10, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular processing system platform, processor, operating system, or network. In addition, it should be apparent to those skilled in the art that the present disclosure is not limited to a specific programming language or processing system. Further, it should be appreciated that other appropriate programming languages and other appropriate processing systems could also be used.

One or more portions of the processing system may be distributed across one or more processing systems coupled to a communications network. For example, as discussed above, a processing system that determines available power capacity may be located remotely from a system manager. These processing systems also may be processing system systems. For example, various aspects of the disclosure may be distributed among one or more processing systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. In addition, it should be appreciated that the disclosure is not limited to any particular distributed architecture, network, or communication protocol.

Various embodiments of the present disclosure may be programmed using an object-oriented programming language, such as SmallTalk, Java, C++, Ada, or C# (C-Sharp). Other object-oriented programming languages may also be used. Alternatively, functional, scripting, and/or logical programming languages may be used, such as BASIC, ForTran, COBoL, TCL, or Lua. Various aspects of the disclosure may be implemented in a non-programmed environment (e.g., documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

Embodiments of a systems and methods described above are generally described for use in relatively large data centers having numerous equipment racks; however, embodiments of the disclosure may also be used with smaller data centers and with facilities other than data centers. Some embodiments may also be a very small number of computers distributed geographically to not resemble a particular architecture.

In embodiments of the present disclosure discussed above, results of the analysis are described as being provided in real-time. As understood by those skilled in the art, the use of the term real-time is not meant to suggest that the results are available immediately, but rather, are available quickly giving a designer the ability to try a number of different designs over a short period of time, such as a matter of minutes.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

The invention claimed is:

1. A method of processing a sequential federated query for distributed systems, comprising:
   receiving, at a processor, a sequential federated query specifying at least one unstructured data source without relation to a distributed system, and a data organization parameter;
   generating, at the processor, a contextual result data set related to the distributed system from a contextual data source related to the distributed system based on the data organization parameter;
   processing, at the processor, the contextual result data set to develop a unstructured data query;
   generating, at the processor, an unstructured data result data set from the unstructured data source based on the developed unstructured data query;

generating, at the processor, a final formatted sequential federated query data set based on the unstructured data result data set validated for use by a management system; and providing, at the processor, the final formatted sequential federated query data set to the management system for action.

2. The method of claim 1, wherein receiving the sequential federated query is initiated from at least one of a user, or a system.

3. The method of claim 1, wherein receiving the sequential federated query is from at least one of a database, a user interface, and an application interface.

4. The method of claim 1, further comprising:
deconstructing, at the processor, the sequential federated query into query elements, wherein the query elements are contextual based.

5. The method of claim 4, wherein the query elements are data locations.

6. The method of claim 4, wherein the query elements are data operations.

7. The method of claim 4, wherein a plurality of contextual data sources related to the distributed system, unstructured data sources without relation to a distributed system, or data organization parameters based on the query elements are utilized.

8. The method of claim 1, wherein the contextual result data set includes operational anomaly data generated by connected elements.

9. The method of claim 1, wherein unstructured data result set is in time series data, time series state data, time stamp data or, unstructured data format.

10. The method of claim 1, wherein the management system for action is a Building Management System (BMS).

11. A non-transitory computer readable medium storing sequences of computer-executable instructions for processing a sequential federated query for distributed systems, the sequences of computer executable instructions including instructions that instruct at least one processor to:
receive a sequential federated query specifying at least one unstructured data source without relation to a distributed system, and a data organization parameter;
generate a contextual result data set related to the distributed system from a contextual data source related to the distributed system based on the data organization parameter;
process the contextual result data set to develop a unstructured data query;
generate an unstructured data result data set from the unstructured data source based on the developed unstructured data query;
generate a final formatted sequential federated query data set based on the unstructured data result data set validated for use by a management system; and
provide the final formatted sequential federated query data set to the management system for action.

12. The non-transitory computer readable medium of claim 11, wherein the at least one processor is further configured to receive the sequential federated query is from at least one of a database, a user interface, and an application interface.

13. The non-transitory computer readable medium of claim 11, further comprising:
deconstructing the sequential federated query into query elements, the query elements are contextual based.

14. The non-transitory computer readable medium of claim 13, wherein the at least one processor is further configured that the query elements are data locations.

15. The non-transitory computer readable medium of claim 13, wherein the at least one processor is further configured that the query elements are data operations.

16. The non-transitory computer readable medium of claim 13, wherein the at least one processor is further configured that a plurality of contextual data sources related to the distributed system, unstructured data sources without relation to a distributed system, or data organization parameters, based on the query elements are utilized.

17. The non-transitory computer readable medium of claim 11, wherein the at least one processor is further configured that the contextual result data set includes operational anomaly data generated by connected elements.

18. The non-transitory computer readable medium of claim 11, wherein the at least one processor is further configured that the unstructured data result set is in time series data, time series state data, time stamp data or, unstructured data format.

19. The non-transitory computer readable medium of claim 11, wherein the at least one processor is further configured that the management system for action is a Building Management System (BMS).

20. A system, comprising:
one or more computer processors; and
a memory containing computer program code that, when executed by operation of the one or more computer processors, performs an operation for processing a sequential federated query for distributed systems, the operation comprising:
receiving, at a processor, a sequential federated query specifying at least one unstructured data source without relation to a distributed system, and a data organization parameter;
generating, at the processor, a contextual result data set related to the distributed system from the a contextual data source related to the distributed system based on the data organization parameter;
processing, at the processor, the contextual result data set to develop a unstructured data query based on the data organization parameter;
generating, at the processor, an unstructured data result data set from the unstructured data source based on the developed unstructured data query;
generating, at the processor, a final formatted sequential federated query data set based on the unstructured data result data set validated for use by a management system; and
providing, at the processor, the final formatted sequential federated query data set to the management system for action.

* * * * *